UNITED STATES PATENT OFFICE.

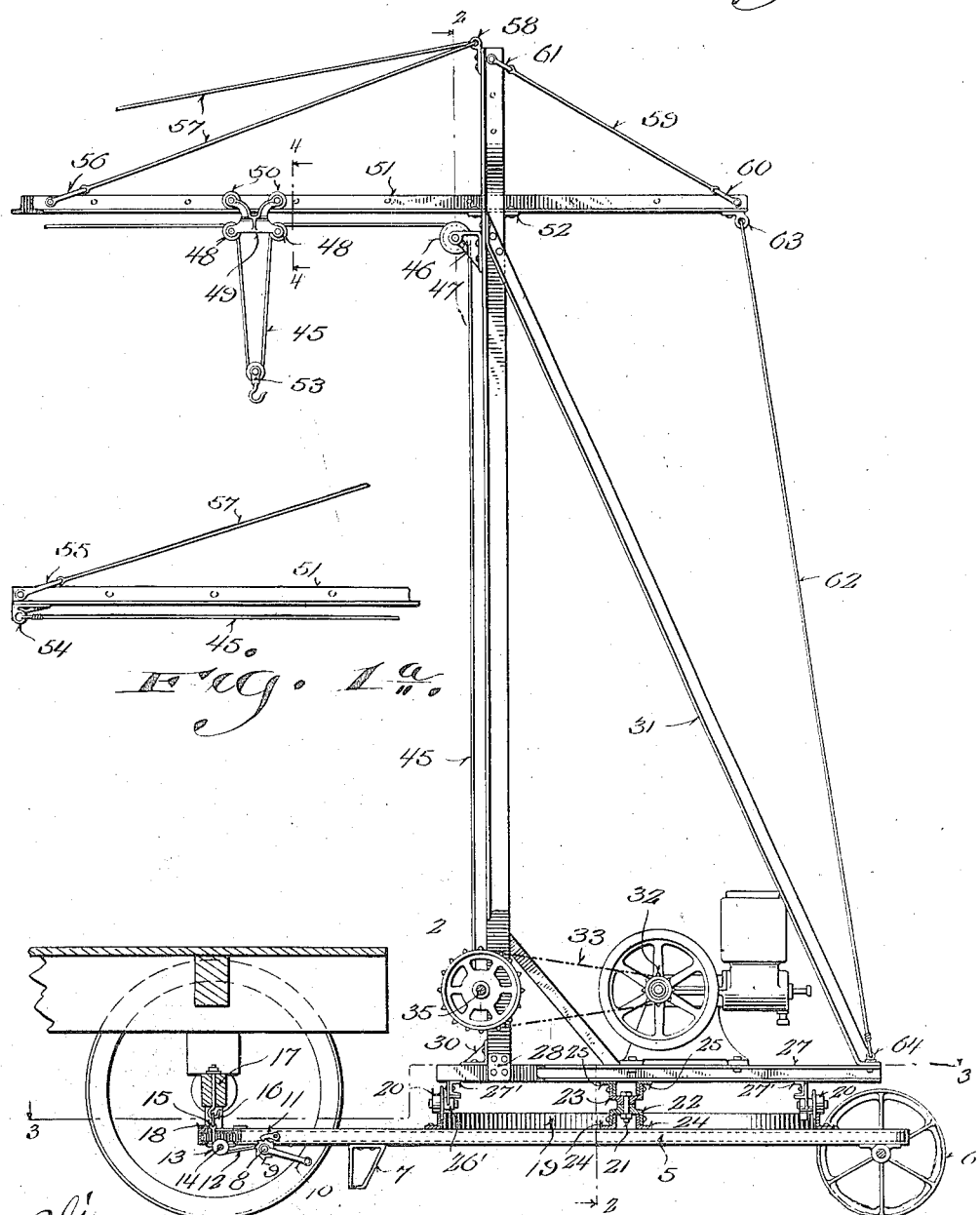

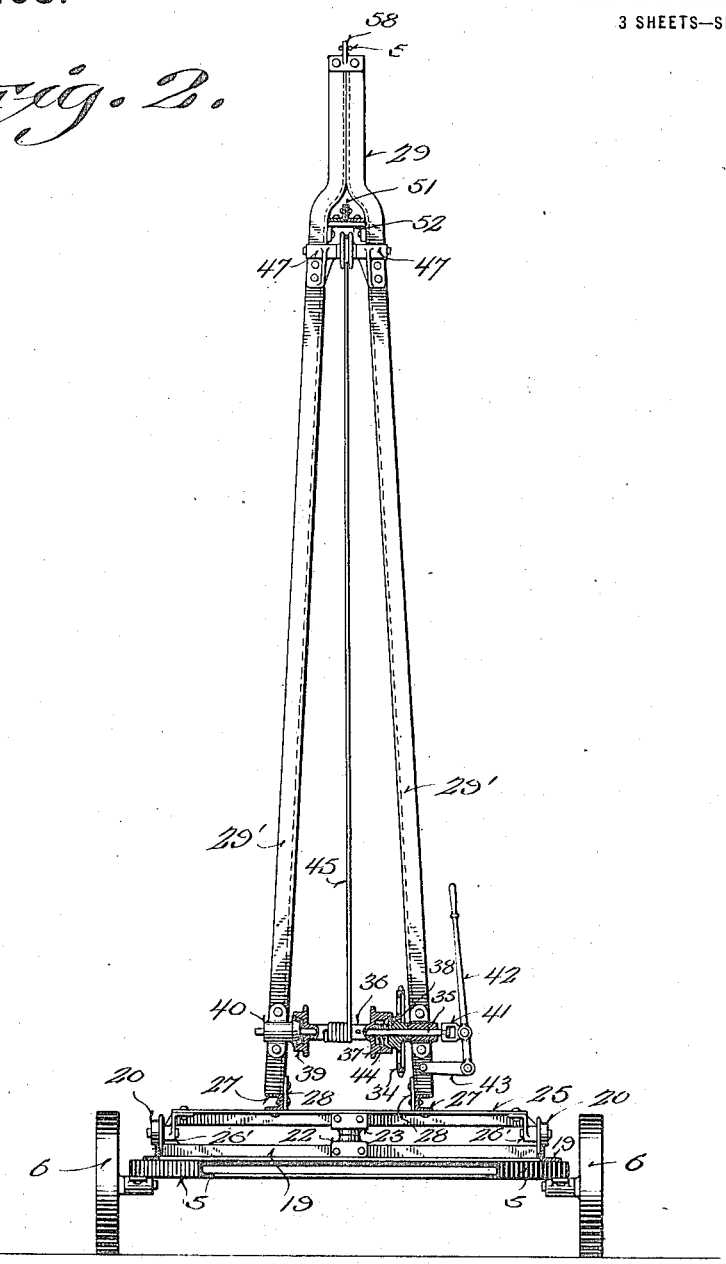

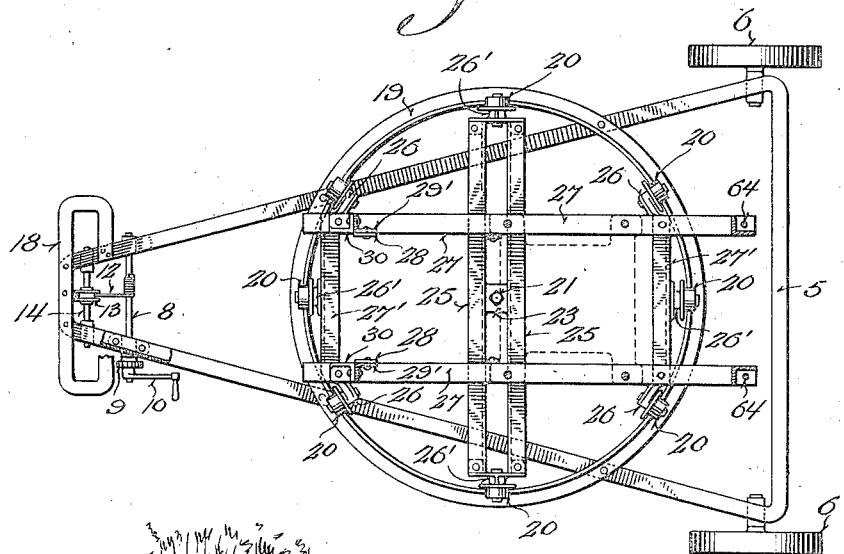

GARFIELD H. CALEY, OF WATERFORD, WISCONSIN, ASSIGNOR OF ONE-THIRD TO HERMAN J. HEMBROOK, OF WATERFORD, WISCONSIN.

TURN-TABLE STRUCTURE FOR CORN-STACKING MACHINES.

1,215,108.      Specification of Letters Patent.    Patented Feb. 6, 1917.

Application filed March 30, 1915. Serial No. 18,047.

*To all whom it may concern:*

Be it known that I, GARFIELD H. CALEY, a citizen of the United States, and resident of Waterford, in the county of Racine and State of Wisconsin, have invented certain new and useful Improvements in Turn-Table Structures for Corn-Stacking Machines; and I do hereby declare that the following is a full, clear, and exact description thereof.

My invention consists in what is herein particularly set forth with reference to the accompanying drawings and pointed out in the claims of this specification, its object being to provide simple, economical and efficient hoisting mechanism especially designed to facilitate the loading and stacking of corn shocks, said mechanism consisting of a carriage attachable to the rear axle of a truck, wagon, hay-rack or the like; a frame rotatable on the carriage, and hoisting-mechanism with the frame, which hoisting-mechanism embodies a motor that is preferably an internal combustion engine.

Figure 1 of the drawings represents a partly sectional side elevation of a shock-loader and stacker in accordance with my invention in connection with the rear axle of a truck, the boom and carrier mechanism of the apparatus being partly broken away;

Fig. 1ª, a side elevation of the broken away boom and carrier mechanism;

Fig. 2, a front elevation of the apparatus partly in section, the section being indicated by line 2—2 in Fig. 1;

Fig. 3, a plan view partly in horizontal section, parts being broken away, the view being indicated by line 3—3 in Fig. 1;

Fig. 4, a cross-section of a detail, the view being indicated by line 4—4 in Fig. 1, and Fig. 5, an elevation of a corn-shock and a grapple thereon in connection with the carrier element of said loader and stacker.

Referring by numerals to the drawings, 5 indicates a triangular frame and 6 wheels therewith at the rear thereof where said frame is widest, said frame and wheels forming the carriage of the herein described apparatus. Adjacent to its forward end, the sides of the carriage are provided with underhung rests 7 that have their function when said carriage is detached from a hauling vehicle.

Adjacent to its front end, the carriage is provided with underneath bearings for the roller 8 of a windlass that embodies the usual ratchet-wheel 9 and a crank 10 with said roller, as well as a detent 11 engageable with said ratchet-wheel, the detent being in pivotal connection with a side of said carriage. Wound on the windlass-rod is a cable 12 that extends under a pulley 13, having an axle 14 hung underneath the carriage forward of said rod. The cable is provided with an eye 15 engageable with a hook 16 in connection with the rear axle 17 of a hauling vehicle, as shown in Fig. 1, and said cable is wound on the windlass rod to elevate the front end of the carriage until the frame thereof is approximately horizontal, the rests 7 being then clear of the ground over which said carriage travels. The hook 16 is approximately central of the axle 17, and the sides of the carriage-frame being forwardly convergent, clearance is had for turning of the hauling vehicle when said carriage is attached thereto.

Fast on the front end of the carriage to laterally extend therefrom in opposite directions, is a rub-iron or plate 18 that opposes said axle of the hauling vehicle to prevent undue tilt of said carriage and mechanism therewith when the same has travel on sloping surface.

Fastened on the carriage-frame is a circular track 19 for a series of wheels 20, conveniently hung in connection with members of a riding frame that is centrally pivoted to the carriage-frame. As a matter of detail, the pivot-bolt 21 extends through abutting flanged boxes 22, 23, respectively fastened to crossbars 24 of the carriage and members 25 of the riding frame. The wheels 20 are carried by brackets 26, 26', and the disposition of said wheels is such as to balance the riding frame on the circular track.

Bolted to riding frame members 27 are vertically disposed plates 28, and likewise connected to the plates are legs 29' of a straddle mast 29. Stay-blocks 30 for the mast are fastened to the legs of the same and to the members 27 of the riding frame. Mast braces 31 are also fastened to said legs and to the riding frame members 27.

The carriage-frame cross-bars 24, the track 19, the riding frame members 25, the members of the mast, and the mast braces and a boom hereinafter more particularly specified may be of angle-iron as is herein shown. The triangular portion of the carriage frame and the riding frame members 27 and 27' may be channel-irons as is also herein shown.

Bolted on the riding frame members 27 is a motor in the form of an internal combustion engine having a sprocket-wheel 32 fast on its shaft in engagement with a link-belt 33 that also engages a similar wheel 34 loose on a shaft 35 for which the legs of the mast are provided with bearings. Fast on the shaft is a windlass roller 36 having a clutch-end 37 engageable with a clutchend 38 of the hub of the wheel 34. A brake-end 39 of said roller is engageable with a brake-end of a bearing 40 for the shaft 35. The shaft turns in a swivel 41 coupled to a lever 42, and a link 43 is connected to the lever and a leg of the mast. Interposed between the wheel 34 and the windlass roller 36 is a spring 44, and the expansive force of the spring causes a shift of the shaft 35 and said roller to effect an engagement of the brake elements 39 and 40, the brake being tightened by a manual operation of said lever. A similar operation of the lever in the opposite direction against spring-resistance effects a clutch-engagement of the windlass roller with the hub of the wheel 34 in gear with the motor.

Partly wound on the windlass roller 36 is a rope or cable 45 constituting a flexible runner that extends upward over a pulley 46 having an axle for which the legs of the mast are provided with bearings 47 adjacent to the crotch of said mast. The flexible runner is trained on pulleys 48 of a carrier 49 having wheels 50 that run on a boom 51 that is fast on bracket 52 fastened between the legs of the mast. A snatch-block 53 is hung in a bight of the flexible runner 45 under the carrier 49, and the outer end of said runner is fastened to an eye-bracket 54, attached to the outer end of said boom.

A clevis 55 is connected to the outer end of the boom, and farther back said boom is provided with another clevis 56. A flexible stay 57 is run through an eye-bracket 58 at the masthead and connected at its ends to said clevises. Another stay 59 is connected at its ends to a boom clevis 60 and a masthead clevis 61. A flexible stay 62 extended through a rear eye-bracket 63 of the boom is connected at its ends to eye-blots 64 that fasten feet of the mast braces to the riding frame.

As best shown in Fig. 4, the boom may be made of two angle-iron strips bolted together, and the carrier 49 straddles said boom.

The windlass roller 36 is normally free from sprocket 34 through the action of spring 44 that separates the clutch end 37 and said roller, as described.

Employed in connection with the hook of the snatch-block 53 is a tie-band 65 that extends through an eye of a fulcrum-bar 66 for the lever handle 67' of a fork 67, engageable with a shock encircled by said band, and said bar is provided with a latch 68 engageable with said handle of the fork, all as shown in Fig. 5. The fork has the function of preventing the tie-band from pulling off the shock when a hoisting operation takes place.

As a matter of detail, the tie-band is attached at one end to a sheave-block 69, and hung in this block is a clamp 70 that binds upon said band run through said block over the sheave 71.

The derrick consisting of the riding frame, mast, boom, hoisting mechanism and motor aforesaid is rotatably adjustable to facilitate the picking up of shocks in a field and loading them onto the hauling vehicle, or to facilitate the unloading and stacking of said shocks.

The mechanism above specified may be utilized in connection with a hauling vehicle for the loading and unloading of various materials other than corn shocks.

In matters of structural detail my improved hoisting mechanism may be varied from what is shown and described as a preferable construction without departure from my invention as herein claimed.

I claim:

1. In a structure of the class described, a triangular frame, a turn table on the frame, hoisting mechanism mounted on the turn table, wheels at the base end of the frame, means at the apex end of the frame for suspending it from the rear axle structure of a vehicle, and a rub plate at the apex end of the frame extending laterally of the sides of the frame and adapted for engagement with the vehicle.

2. In a structure of the class described, a frame, a turn table on the frame, hoisting mechanism mounted on the turn table, wheels at the rear end of the frame, a supporting leg at the forward end of the frame, and means for suspending the forward end of the frame, from the rear portion of a vehicle with its supporting legs spaced above the ground, said means comprising a windlass carried by the frame, a pulley at the forward end of the frame, a cable on the windlass trained about said pulley and a member carried by the cable and adapted for detachable connection with a vehicle carried member.

3. In a structure of the class described, a triangular frame comprising convergent side sills connected at their forward end, and a rear sill, a wheeled support for the frame, a circular track of greater diameter than the distance between intermediate side sill portions of the frame and secured to the side sills at its points of intersection therewith whereby said sides are braced transversely of the frame, and a turn table member engageable on the track.

In testimony that I claim the foregoing I have hereunto set my hand at Waterford, in the county of Racine and State of Wisconsin, in the presence of two witnesses.

GARFIELD H. CALEY.

Witnesses:
  HARRY C. BERGER,
  A. S. TITUS.